（12) United States Patent
Beaudoin

(10) Patent No.: US 10,125,923 B2
(45) Date of Patent: Nov. 13, 2018

(54) SECURITY APPARATUS FOR A VERTICAL BALER

(71) Applicant: Jean-Francois Beaudoin, Plessisville (CA)

(72) Inventor: Jean-Francois Beaudoin, Plessisville (CA)

( * ) Notice: Subject to any disclaimer, the term of this patent is extended or adjusted under 35 U.S.C. 154(b) by 778 days.

(21) Appl. No.: 14/721,149

(22) Filed: May 26, 2015

(65) Prior Publication Data

US 2015/0338021 A1    Nov. 26, 2015

(30) Foreign Application Priority Data

May 26, 2014  (GB) .................................. 1409322.3

(51) Int. Cl.
| | | |
|---|---|---|
| *B30B 9/30* | (2006.01) | |
| *A01F 21/00* | (2006.01) | |
| *F16P 3/08* | (2006.01) | |
| *F16P 1/02* | (2006.01) | |

(52) U.S. Cl.
CPC ............... *F16P 3/08* (2013.01); *A01F 21/00* (2013.01); *B30B 9/3014* (2013.01); *F16P 1/02* (2013.01); *B30B 9/3032* (2013.01)

(58) Field of Classification Search
CPC ..... B03B 9/3014; B03B 9/3032; A01F 21/00; F16P 1/02; F16P 3/08
USPC ................... 100/349, 218, 240, 245
See application file for complete search history.

(56) References Cited

U.S. PATENT DOCUMENTS

| | | | | |
|---|---|---|---|---|
| 463,076 | A | * 11/1891 | Rowe .................... | B30B 9/3032 100/254 |
| 561,661 | A | * 6/1896 | Garraux ............... | B30B 9/3032 100/255 |
| 3,358,590 | A | 12/1967 | Howard | |
| 3,851,577 | A | 12/1974 | Newcom et al. | |
| 3,885,466 | A | 5/1975 | Cerniglia | |
| 3,945,313 | A | 3/1976 | Komberec et al. | |
| 4,182,236 | A | * 1/1980 | Greer .................... | B30B 9/3014 100/218 |
| 4,232,599 | A | * 11/1980 | Ulrich ................... | B30B 9/3014 100/218 |
| 4,363,267 | A | * 12/1982 | Greer .................... | B30B 9/3032 100/255 |
| 4,944,220 | A | 7/1990 | Fox | |

(Continued)

FOREIGN PATENT DOCUMENTS

| | | |
|---|---|---|
| EP | 0819052 | 7/1998 |
| EP | 2565024 | 6/2013 |
| WO | WO9301046 | 1/1993 |

*Primary Examiner* — Jimmy T Nguyen

(57) ABSTRACT

A security apparatus and gate for a vertical baler has a perimeter security barrier formed as a pivotable U-shaped bar adapted to be connected to opposite side walls of the baler and used to block a user from moving too close to the baler when ejecting a bale therefrom, and an operator safety gate adapted to be pivotally connected to one side wall of the vertical baler and overlaping an ejection gate of the vertical baler and used to prevent the ejection gate from pivoting to an open position, such that the baler cannot eject a bale therefrom until the operator safety gate is pivoted into an open position allowing the ejection gate to be pivoted to an open position and the perimeter security barrier is pivoted into a blocking position.

9 Claims, 8 Drawing Sheets

(56) References Cited

U.S. PATENT DOCUMENTS 5,044,271 A 9/1991 Robbins et al.
5,575,199 A 11/1996 Yamamoto

* cited by examiner

SECURITY APPARATUS FOR A VERTICAL BALER

This application claims priority based on request GB1409322.3 filed May 26, 2014

FIELD OF THE INVENTION

The present invention relates generally to a security barrier, but more particularly to a security apparatus and gate for a vertical baler or compactor.

BACKGROUND OF THE INVENTION

Recycling of materials is a growing phenomenon and there exist a number of machines which help the industry be more efficient. One of these machines is a vertical baler or compactor used for a variety of materials. The industry and this piece of equipment have seen many safety enhancements over the years. It is as a machine that presently requires a degree of manual intervention which lends itself to possible human error and accidents. Ones such area is the ejection of a bale by the machine after it has been compressed and strapped. These bales can weigh up to 750 kg and can hurt an operator or worker if they happen to be in front of it during ejection. There hence exists a need to minimize accidents during ejection of bales when operating a vertical baler.

SUMMARY OF THE INVENTION

In view of the foregoing disadvantages inherent in the known devices now present in the prior art, the present invention, which will be described subsequently in greater detail, is to provide objects and advantages which are:

To provide for a drop down perimeter security barrier which secures the area where a bale is ejected during operation of a vertical baler.

It is another advantage of this invention that a security gate be provided on the side of the operator which must be opened prior to opening the ejection door. This ensures safety for the operator.

It is a further advantage of this invention that the security gate be opened automatically with the ejection gate and the vertical perimeter bar be closed manually after which a magnetic contact allows the operator to operate the controls to eject the bale from within the vertical baler.

In order to do so, the invention comprises a perimeter security barrier formed as a pivotable U-shaped bar adapted to be connected to opposite side walls of the baler and used to block a user from moving too close to the baler when ejecting a bale therefrom, and an operator safety gate adapted to be pivotally connected to one side wall of the vertical baler and overlaping an ejection gate of the vertical baler and used to prevent the ejection gate from pivoting to an open position, such that the baler cannot eject a bale therefrom until the operator safety gate is pivoted into an open position allowing the ejection gate to be pivoted to an open position and the perimeter security barrier is pivoted into a blocking position.

The main body has a rectangular interior volume adapted to form rectangular bales, a top wall, a bottom wall, a back wall, two opposite vertical side walls, a front opening, and a pivotable front ejection gate adapted to removably cover a portion of the front opening. A control panel attached to an exterior surface of one of the two opposite vertical side walls, a tilting arm located within the rectangular interior volume adapted to be controlled by the control panel and configured to tilt a bale located within the interior volume and push the bale outwardly therefrom. A security apparatus including a perimeter security barrier formed as a pivotable U-shaped bar pivotally connected to the opposite side walls of the baler and used to block a user from moving too close to the baler when ejecting a bale therefrom, and an operator safety gate adapted to be pivotally connected to one side wall of the vertical baler and overlap the ejection gate and used to prevent the ejection gate from pivoting to an open position, such that the baler cannot eject a bale therefrom until the operator safety gate is pivoted into an open position allowing the ejection gate to be pivoted to an open position and the perimeter security barrier is pivoted into a blocking position.

The control panel includes a cover member adapted to be locked and unlocked via a magnetic member, such that when the magnetic member is disengaged the cover member opens and the user can access the control panel and operate the vertical baler.

The magnetic member is engaged and disengaged by a portion of the perimeter security barrier, such that a user cannot access the control panel until the perimeter security barrier is pivoted into the blocking position and disengages the magnetic member thereby allowing the cover member to open and allowing the user to access the control panel and operate the vertical baler.

A sliding panel member adapted to removably cover a portion of the front opening not covered by the ejection gate, wherein the two opposite vertical side walls each include an interior facing vertical track adapted to slidably hold respective edges of the sliding panel member therein and allow the sliding panel member to be slidably attached and removed from the main body, and wherein when the sliding panel member and the ejection gate are in a closed position the baler can produce a bale, and when it is desired to remove the bale the sliding panel member is removed, the operator safety gate and the ejection gate are moved into an open position, the perimeter security barrier is pivoted into the blocking position and disengages the magnetic member thereby allowing the cover member to open and allowing the user to access the control panel and operate the vertical baler to thereby eject the bale.

The ejection gate is pivotally connected to one of the two opposite vertical side walls, and the operator safety gate is pivotally connected to the other of the two opposite vertical side walls, such that when the gates are in respective closed positions they overlap in opposite directions.

When closing the baler the ejection gate is pivoted into its closed position first, and then the operator safety gate is pivoted into its closed position overlapping the ejection gate.

In operation, the operator after compressing the contents of the baler and having it strapped into a bale proceeds to open the ejector gate of the vertical baler using the controls situated on the right of the vertical baler. In order for the ejection door or gate to open, the security gate will first open to the right and then allow the ejection door to open to the left. The operator then proceeds to manually push down the vertically swivelling perimeter security barrier which comes down till it locks parallel to the ground. On locking, the barrier makes magnetic contact which gives access to the operator to control the rest of the ejection process.

At least one latch member extending from a compressing plate assembly is selectively engaged and disengaged from at least one safety locking hook member in such a way that when the at least one safety locking hook member is engaged to the at least one latch member, the compressing plate assembly is in a locked position, and when the at least one safety locking hook member is disengaged from the at least one latch member, the compressing plate assembly is free to move, and wherein the at least one safety locking hook member engages the at least one the latch member whenever the sliding panel member is raised upwardly. Preferably, there are two latch members and two safety locking hook members wherein each latch member and each safety locking hook member are located at opposite sides of the improved vertical baler and wherein each safety locking hook member is connected to the other safety locking hook member by way of a connecting member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
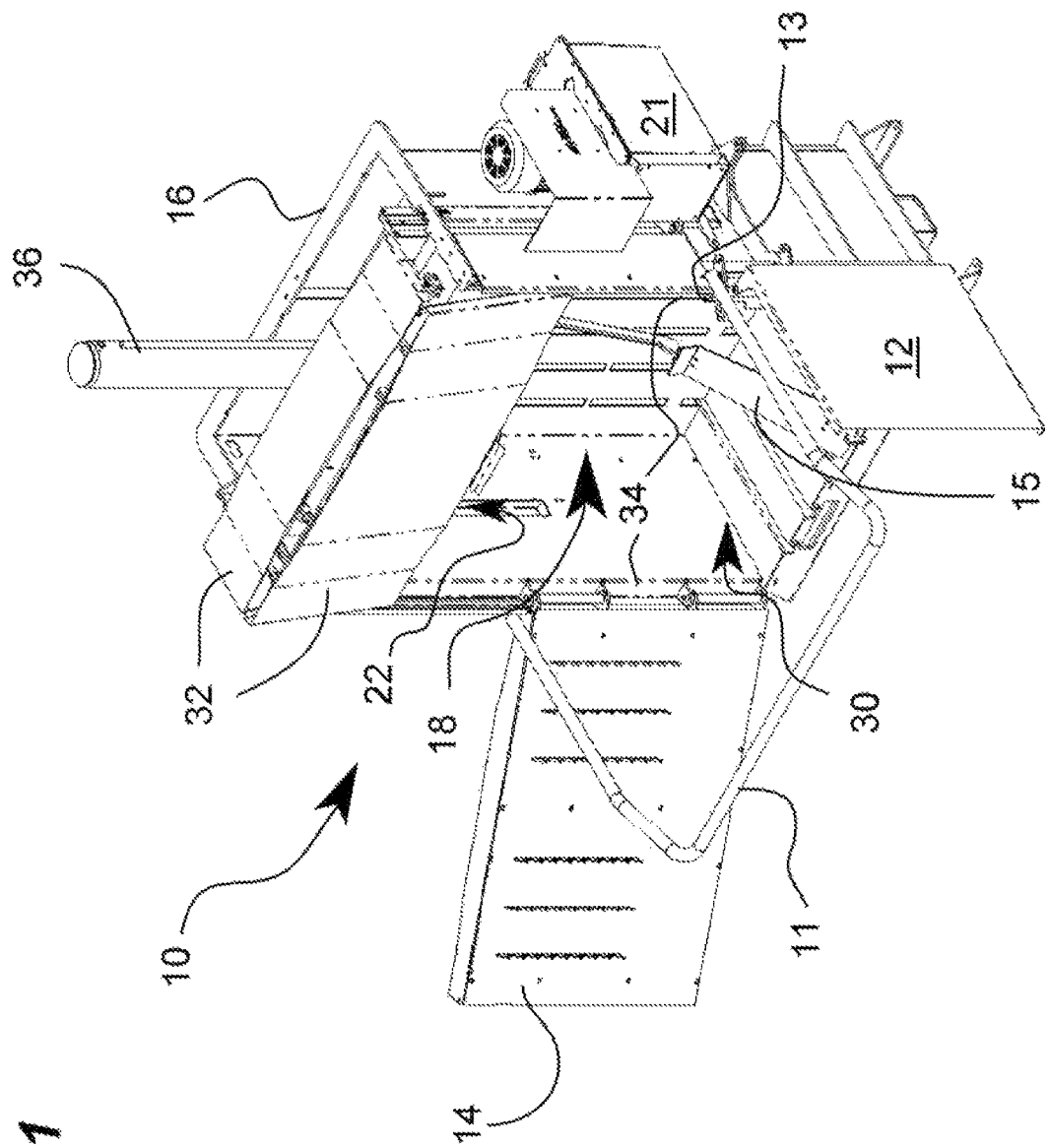
FIG. 1 Isometric view of the invention in use.
Figure 2:
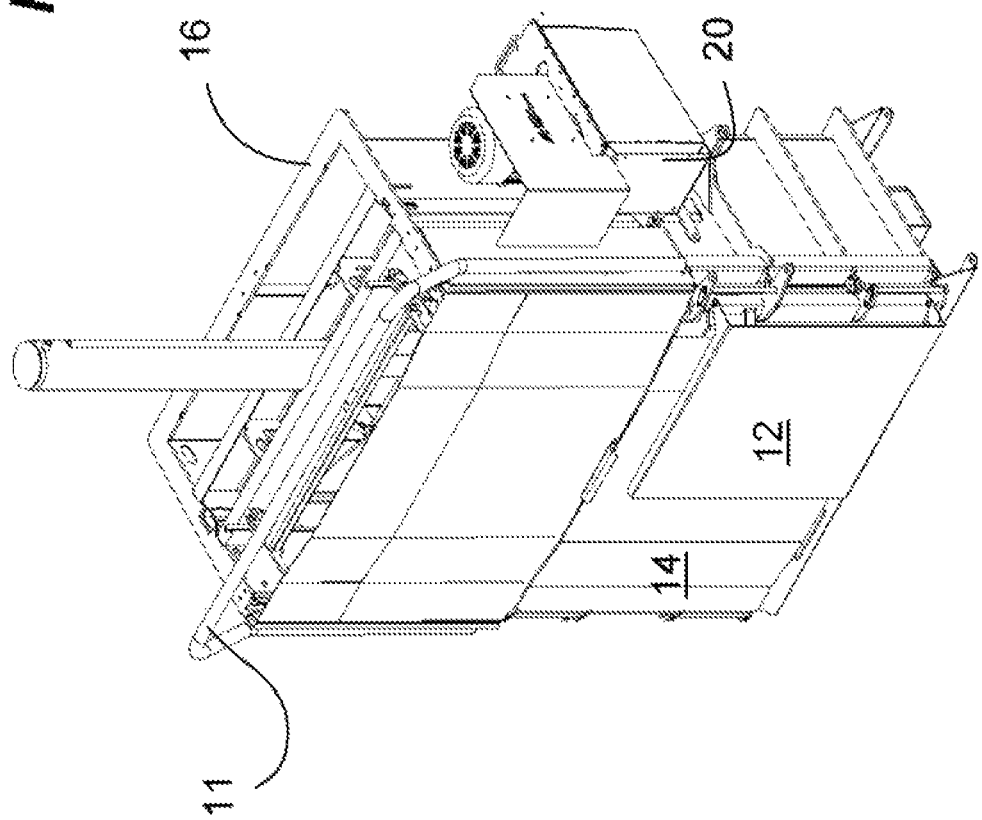
FIG. 2 Isometric view of invention with doors closed.
Figure 3:
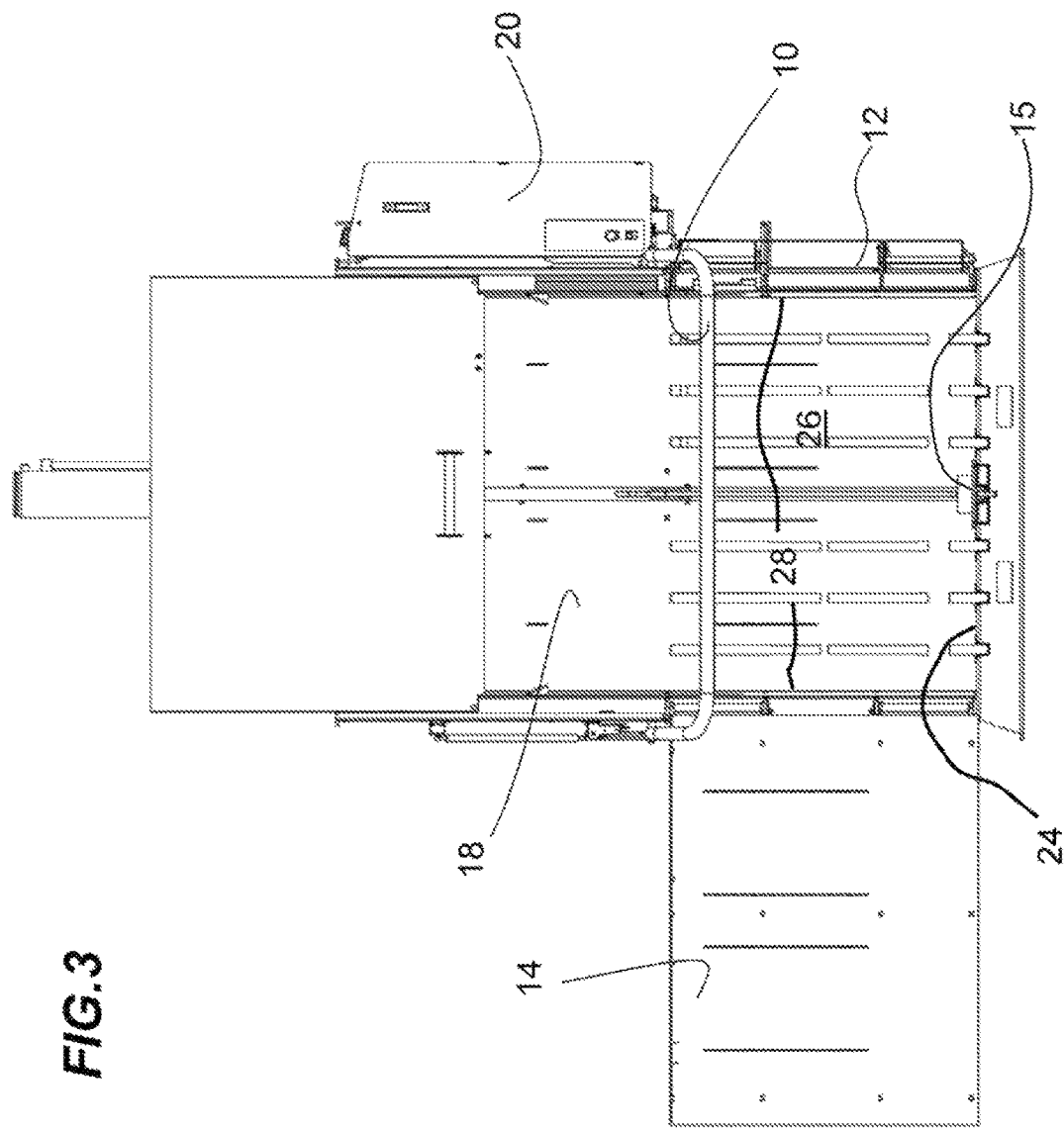
FIG. 3 Front view of the invention in use.
Figure 4:
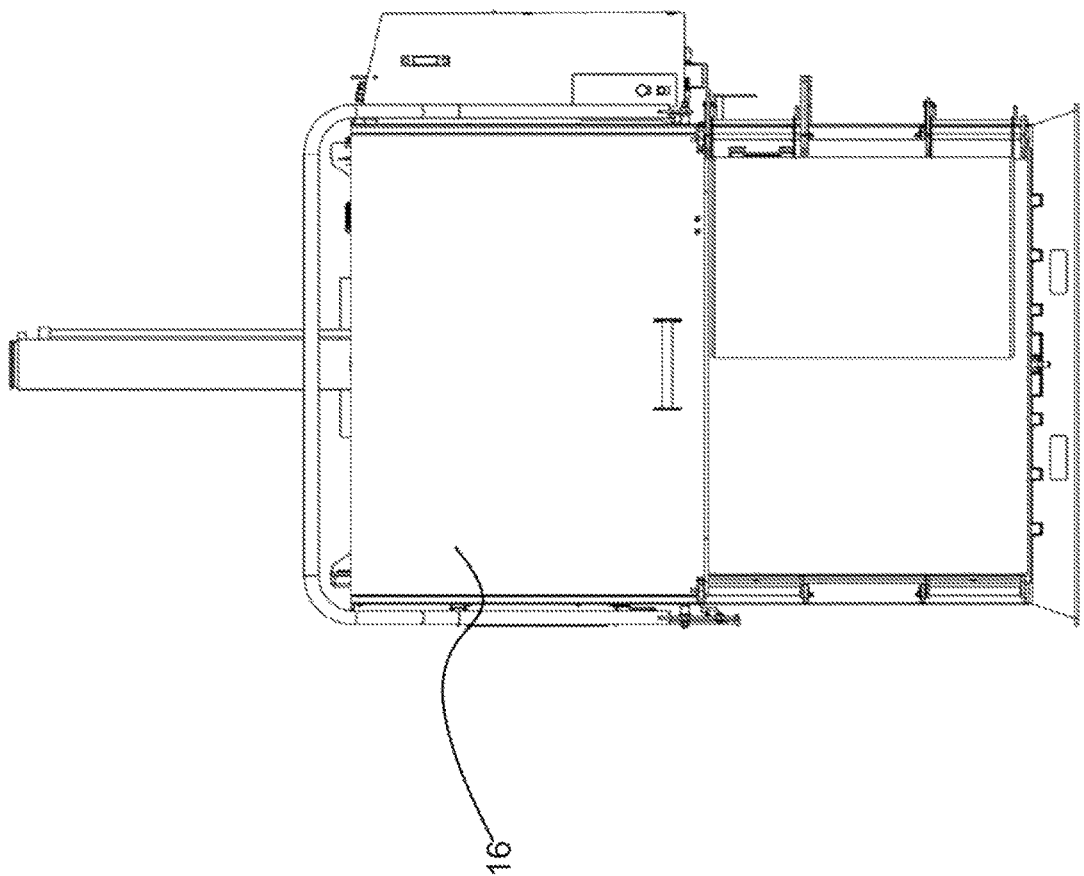
FIG. 4 Front view of the invention with doors closed.
Figure 5:
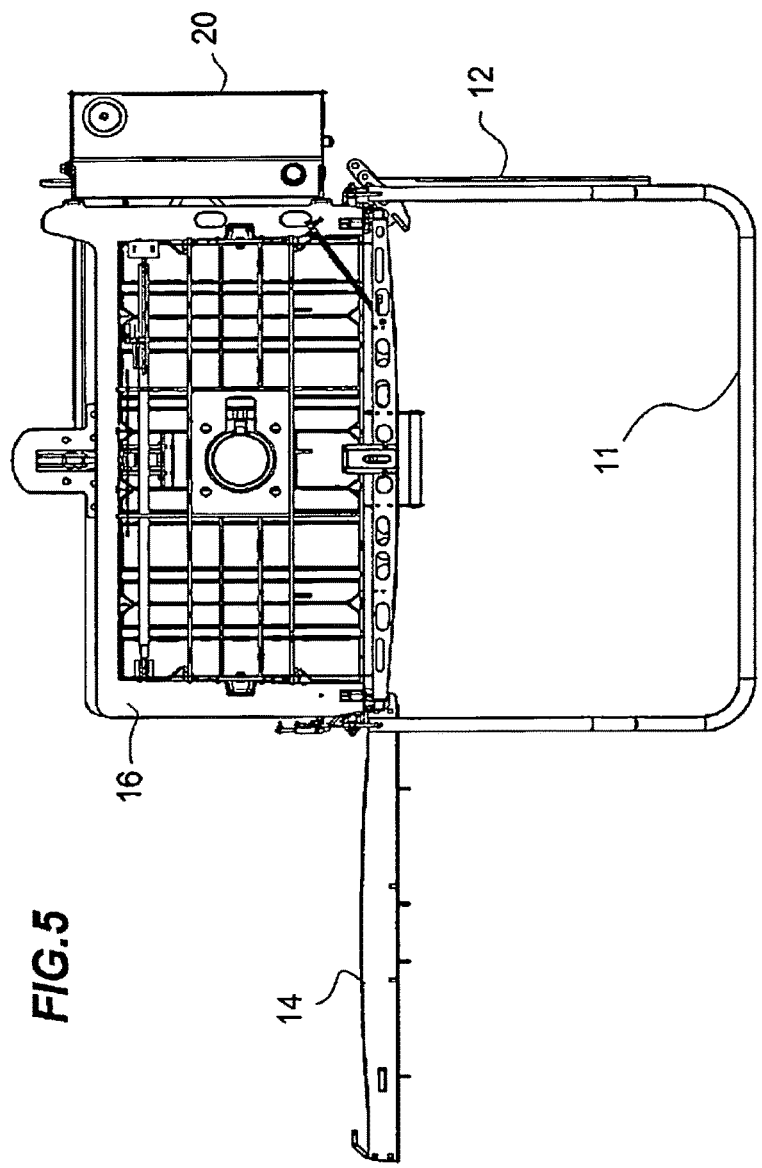
FIG. 5 Top view of the invention in use.

A perimeter security apparatus (10) comprising a perimeter security barrier (11), and operator safety gate (12) to be used in conjunction with an ejection gate (14) for a vertical baler (16) when the vertical baler (16) is in eject mode of operation. An operator (not shown) when ejecting a compressed bale (not shown) from the interior compartment (18) of the vertical baler (16) uses a control panel (20) to open the ejection gate (14) which first opens the operator safety gate (12) and then opens the ejection gate (14). The operator (not shown) then has to manually lower the perimeter security barrier (10) which is in the form of a swivel-down U-shaped bar. Once the perimeter security barrier (11) is down and locked in position, a magnetic member (13) unlocks a cover member (21) so that it can be opened and allow the operator (not shown) to use the control panel (20) to proceed with the next phase of the ejection process which is to eject the bale (not shown) from the interior volume (18) by way of a tilting arm (15) which tilts/pivot the bale so that it falls like a tree, usually on a pallet (not shown) on the floor. The perimeter safety barrier (11) and operator safety gate (12) ensure that the operator (not shown) is kept out of harm's way when the bale (not shown) is ejected and that the bale (not shown) or any part thereof does not hit or fall onto a nearby worker or passerby (not shown).

The vertical baler (16) is comprised of a main body having a rectangular interior volume (18) adapted to form rectangular bales, a top wall (22), a bottom wall (24), a back wall (26), two opposite vertical side walls (28), a front opening (30), and the pivotable front ejection gate (14) adapted to removably cover a portion of the front opening (30). Additional parts include a sliding panel member (32) sliding upwardly and downwardly as guided by vertical tracks (34).

Figure 6A:
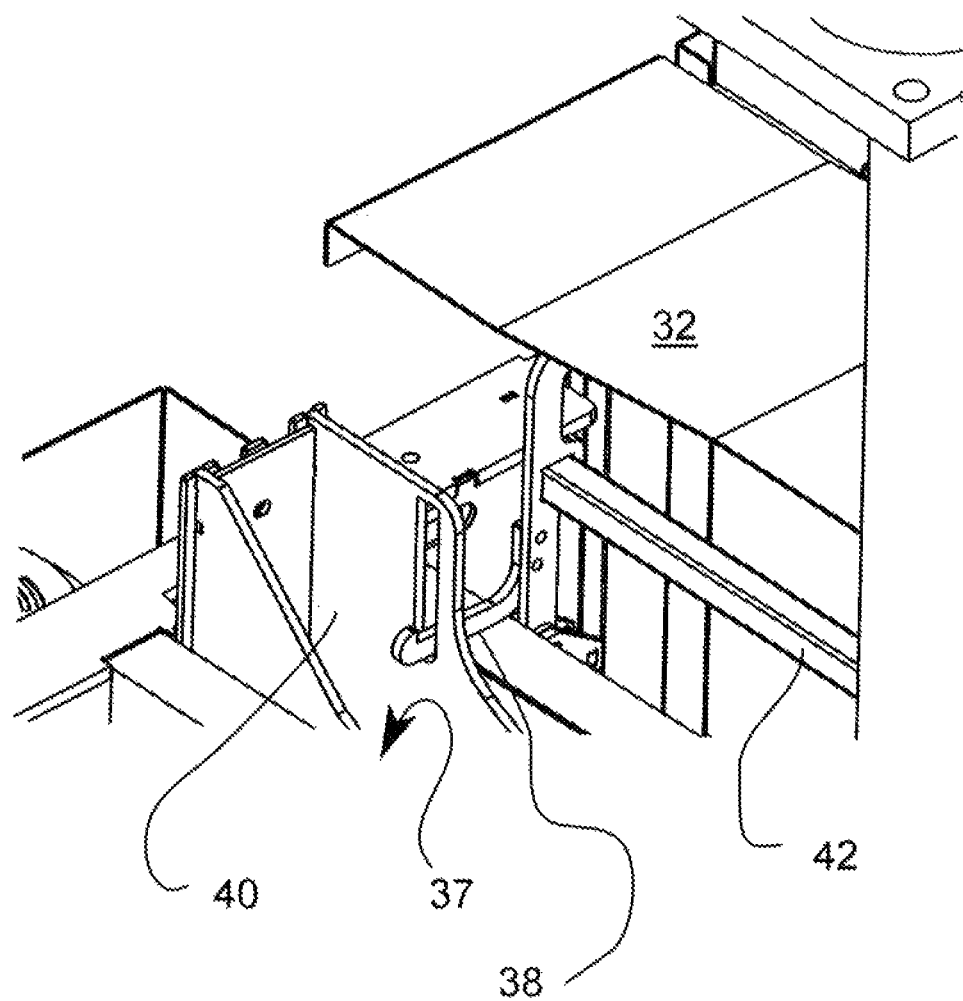
FIGS. 6A-C Isometric views showing the workings of the safety mechanism for the compressing plate assembly.
Figure 6B:
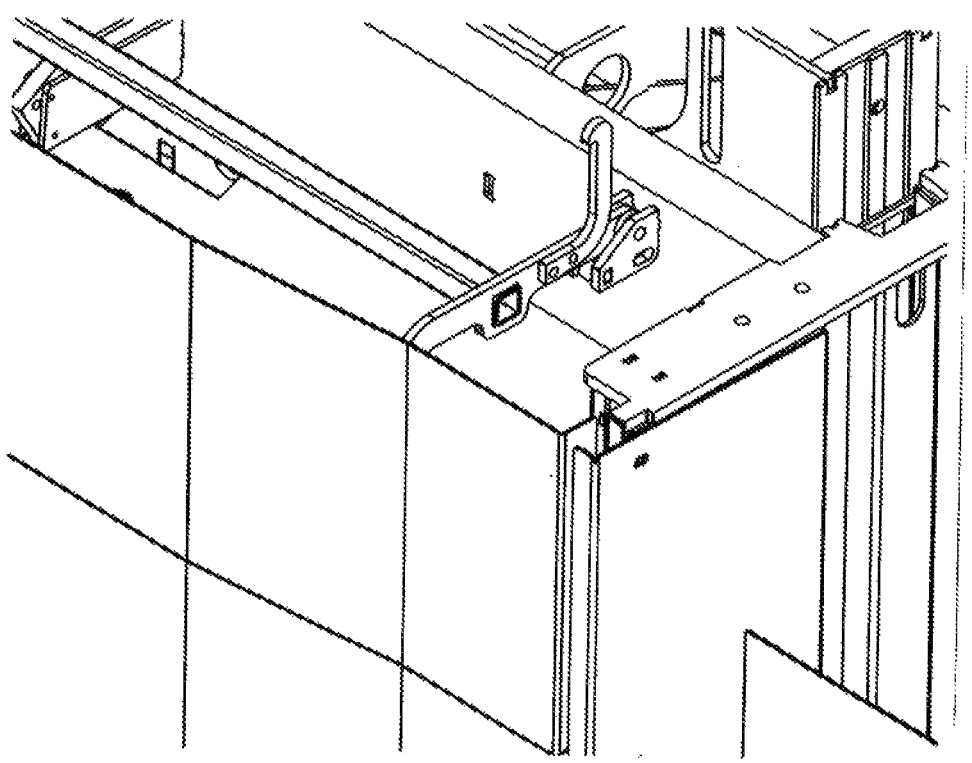
Figure 6C:
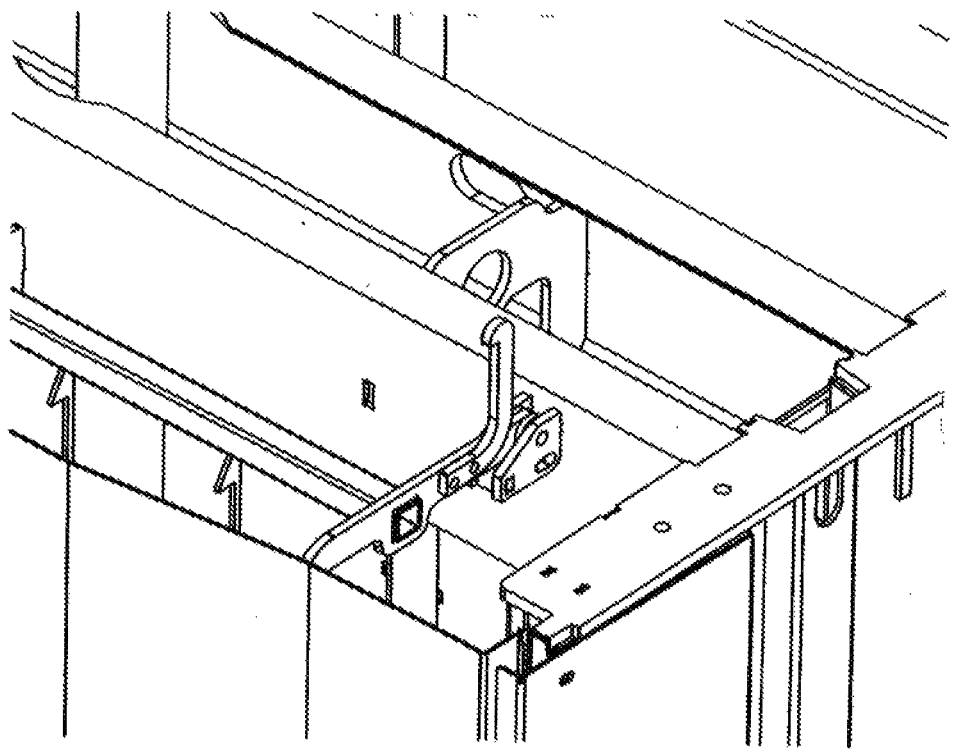

A piston member (36) is connected to a compressing plate assembly (37) partially seen in FIGS. 6A-C. The compressing plate assembly (37) has a pair of latch members (40) extending therefrom and onto which engage a pair of safety locking hook members (38). This prevents accidental drop of the compressing plate assembly (37), should the hydraulic system fail. The hook members (38) are engaged when the sliding panel member (32) is raised. Lowering the sliding panel member (32) disengages the hooks (38) as seen in FIGS. 6B-C. The locking hooks (38) are connected together by way of a connecting member (42). The compressing plate assembly (37) is well known in the art and need not be further discussed herein.

As to a further discussion of the manner of usage and operation of the present invention, the same should be apparent from the above description. Accordingly, no further discussion relating to the manner of usage and operation will be provided.

The invention claimed is:

1. A security apparatus in combination with an ejection gate of a vertical baler, said security apparatus comprising: a perimeter security barrier formed as a pivotable U-shaped bar configured to be connected to opposite side walls of said baler and used to block a user from moving too close to said baler when ejecting a bale therefrom; and an operator safety gate configured to be pivotally connected to one of said side walls of said vertical baler and overlap an ejection gate of said vertical baler and used to prevent said ejection gate from pivoting to an open position, wherein said baler cannot eject a bale therefrom until said operator safety gate is pivoted into an open position allowing said ejection gate to be pivoted to an open position and said perimeter security barrier is pivoted into a blocking position.

2. An improved vertical baler comprising a main body having a rectangular interior volume and a compression plate assembly configured to form rectangular bales, a top wall, a bottom wall, a back wall, two opposite vertical side walls, a front opening, and a pivotable front ejection gate configured to removably cover a portion of said front opening; a control panel attached to an exterior surface of one of said two opposite vertical side walls; a tilting arm located within said rectangular interior volume configured to be controlled by said control panel and configured to tilt a bale located within said interior volume and push said bale outwardly therefrom; and a security apparatus including a perimeter security barrier formed as a pivotable U-shaped bar pivotally connected to said opposite side walls of said baler and used to block a user from moving too close to said baler when ejecting a bale therefrom, and an operator safety gate configured to be pivotally connected to one of said side walls of said vertical baler and overlap said ejection gate and used to prevent said ejection gate from pivoting to an open position, wherein said baler cannot eject a bale therefrom until said operator safety gate is pivoted into an open position allowing said ejection gate to be pivoted to an open position and said perimeter security barrier is pivoted into a blocking position.

3. The improved vertical baler of claim 2, wherein said control panel includes a cover member adapted to be locked and unlocked via a magnetic member, such that when said magnetic member is disengaged said cover member opens and said user can access said control panel and operate said vertical baler.

4. The improved vertical baler of claim 3, wherein said magnetic member is engaged and disengaged by a portion of said perimeter security barrier, such that a user cannot access said control panel until said perimeter security barrier is pivoted into said blocking position and disengages said magnetic member thereby allowing said cover member to open and allowing said user to access said control panel and operate said vertical baler.

5. The improved vertical baler of claim 2, further comprising a sliding panel member adapted to removably cover a portion of said front opening not covered by said ejection gate; wherein said two opposite vertical side walls each include an interior facing vertical track adapted to slidably hold respective edges of said sliding panel member therein and allow said sliding panel member to be slidably attached and removed from said main body, and wherein when said sliding panel member and said ejection gate are in a closed position said baler can produce a bale, and when it is desired to remove said bale said sliding panel member is removed, said operator safety gate and said ejection gate are moved into an open position, said perimeter security barrier is pivoted into said blocking position and disengages said magnetic member thereby allowing said cover member to open and allowing said user to access said control panel and operate said vertical baler to thereby eject said bale.

6. The improved vertical baler of claim 2, wherein said ejection gate is pivotally connected to one of said two opposite vertical side walls, and said operator safety gate is pivotally connected to the other of said two opposite vertical side walls, such that when said gates are in respective closed positions they overlap in opposite directions.

7. The improved vertical baler of claim 6, such that when closing said baler said ejection gate is pivoted into its closed position first, and then said operator safety gate is pivoted into its closed position overlapping said ejection gate.

8. The improved vertical baler of claim 2, wherein at least one latch member extending from the compressing plate assembly is selectively engaged and disengaged from at least one safety locking hook member in such a way that when said at least one safety locking hook member is engaged to said at least one latch member, said compressing plate assembly is in a locked position, and when said at least one safety locking hook member is disengaged from said at least one latch member, said compressing plate assembly is free to move, and wherein said at least one safety locking hook member engages said at least one said latch member whenever said sliding panel member is raised upwardly.

9. The improved vertical baler of claim 8, wherein the at least one latch member comprises two latch members and the at least one safety locking hook member comprises two safety locking hook members, wherein each said latch member and each said safety locking hook member are located at opposite sides of said improved vertical baler and wherein each said safety locking hook member is connected to the other said safety locking hook member by way of a connecting member.

\* \* \* \* \*